Nov. 10, 1931.  E. B. LOCKE  1,831,182
COMPUTING SCALE
Filed Jan. 15, 1923   7 Sheets-Sheet 1
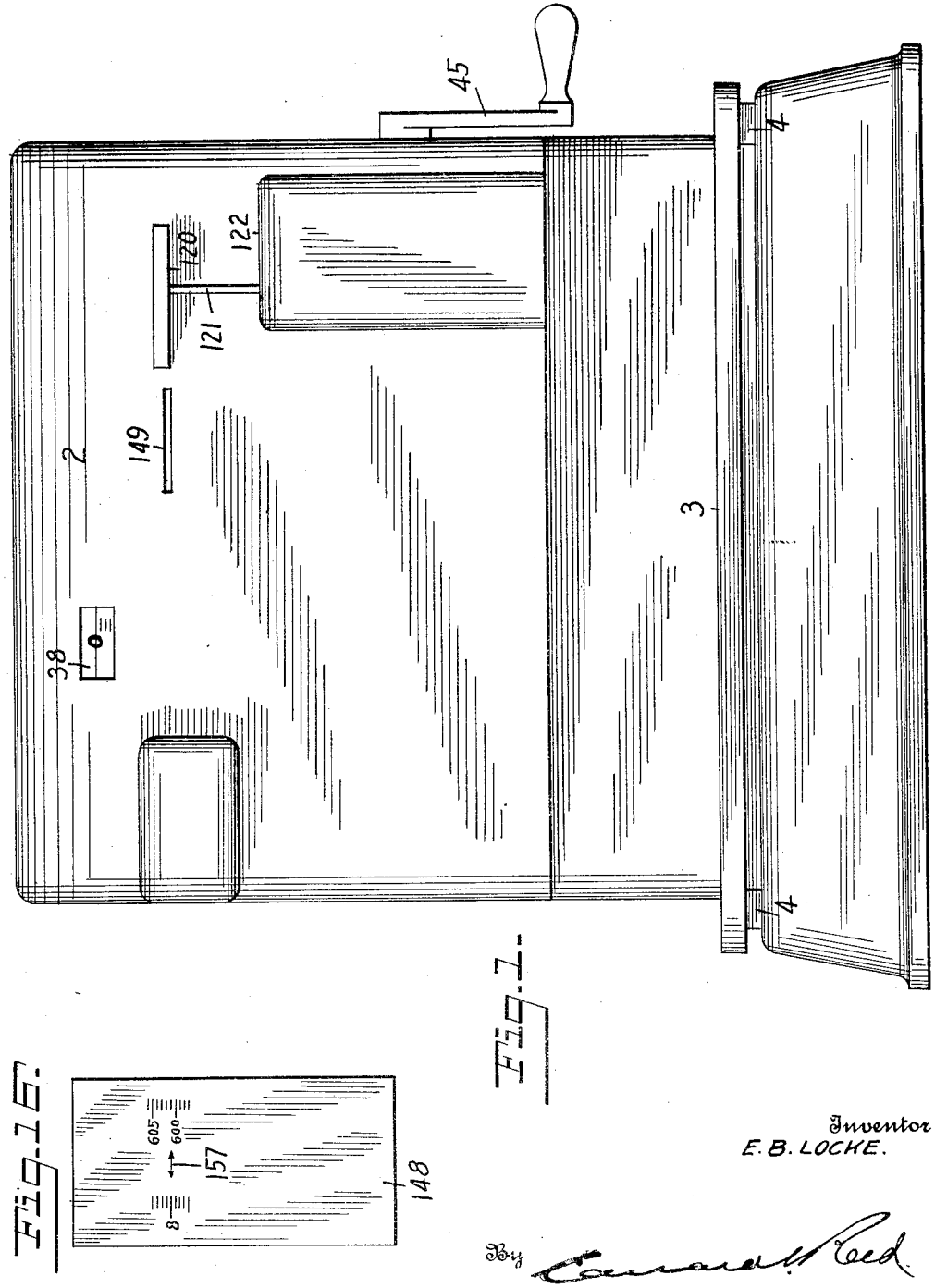
Inventor
E. B. LOCKE.
Attorney Nov. 10, 1931.  E. B. LOCKE  1,831,182
COMPUTING SCALE
Filed Jan. 15, 1923  7 Sheets-Sheet 2
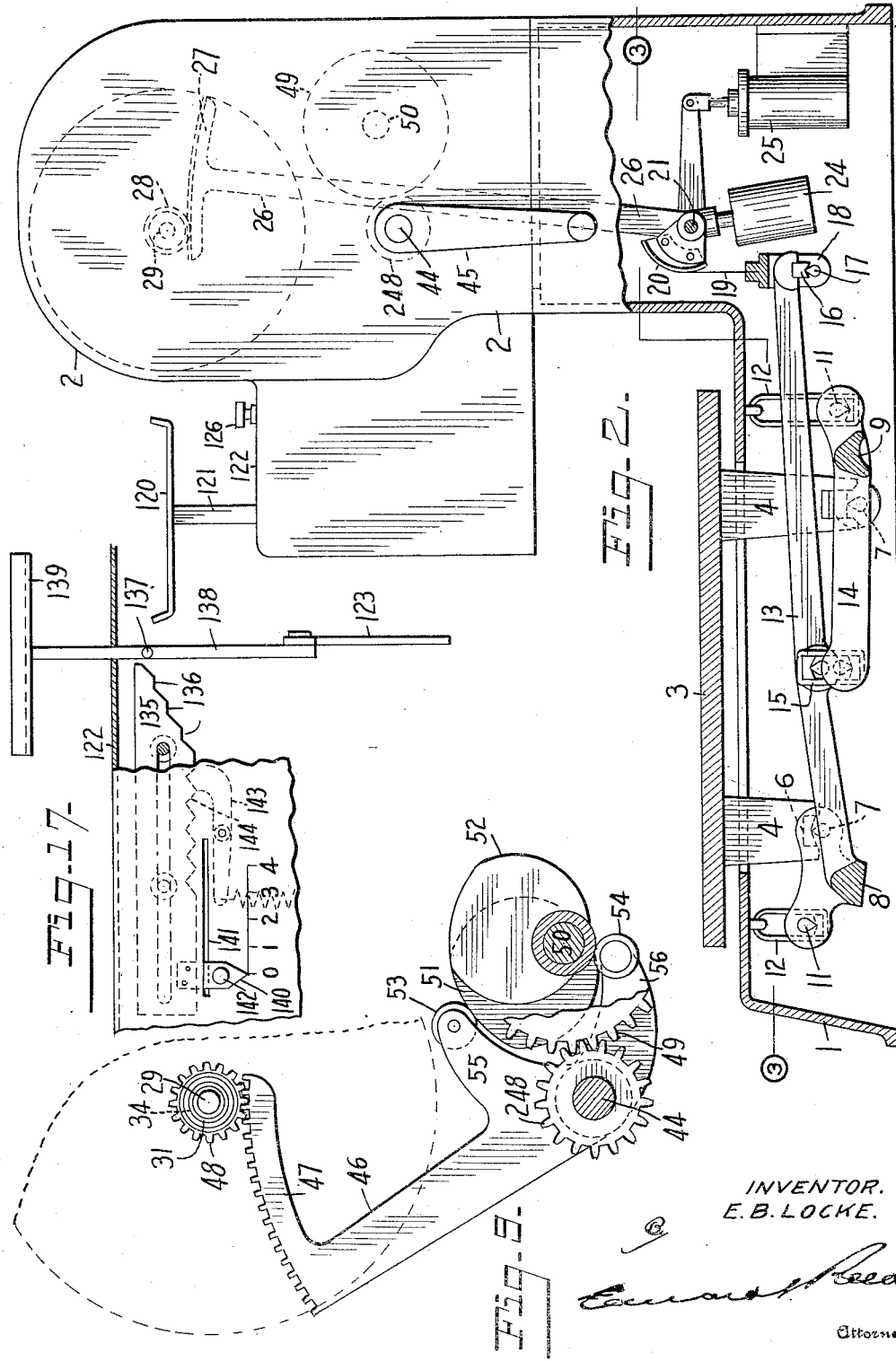
INVENTOR.
E. B. LOCKE.
Attorney Nov. 10, 1931.  E. B. LOCKE  1,831,182
COMPUTING SCALE
Filed Jan. 15, 1923  7 Sheets-Sheet 3
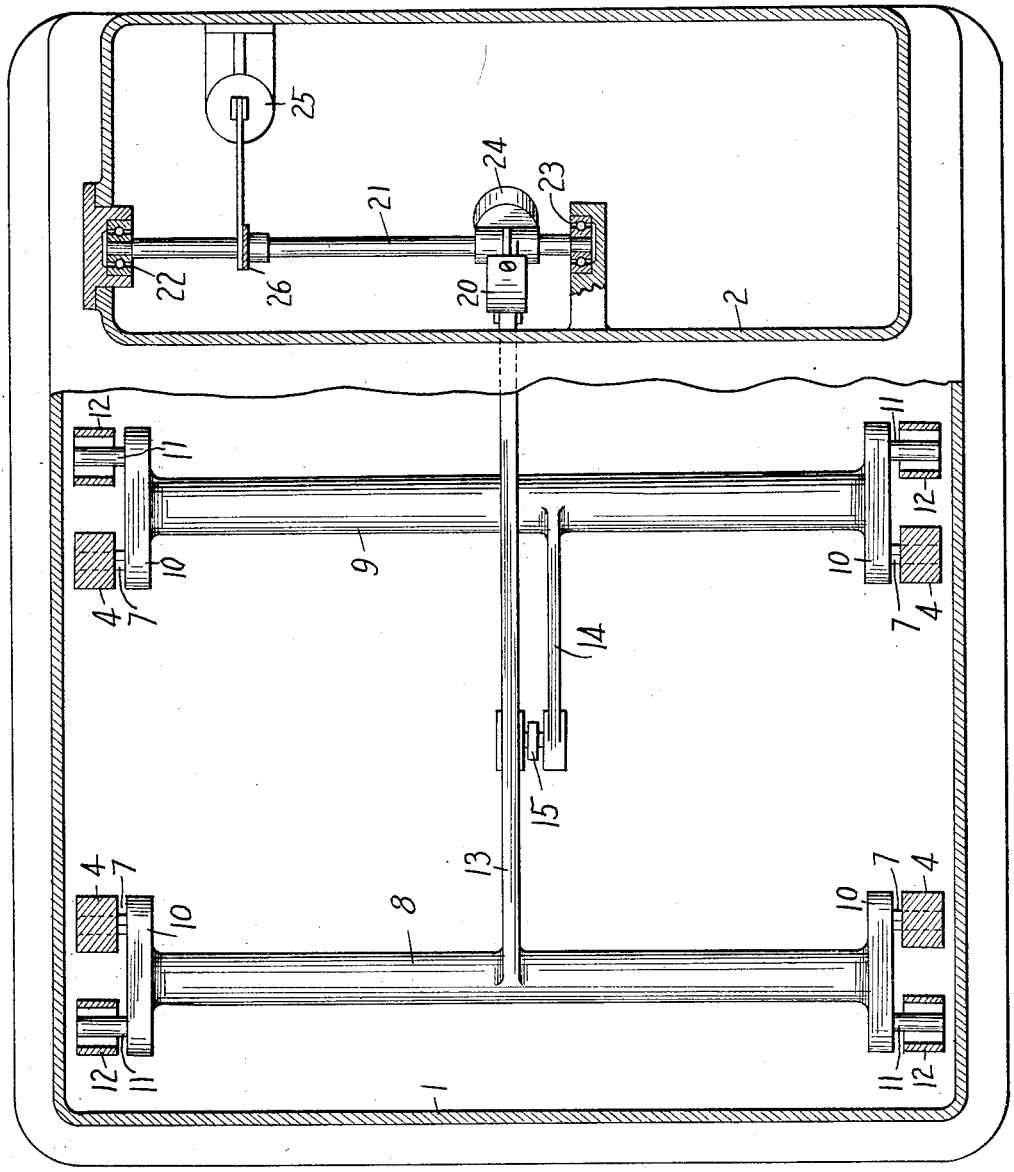
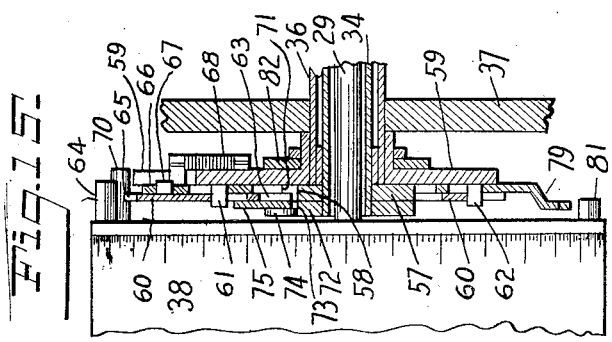
Inventor
E. B. LOCKE.
Attorney

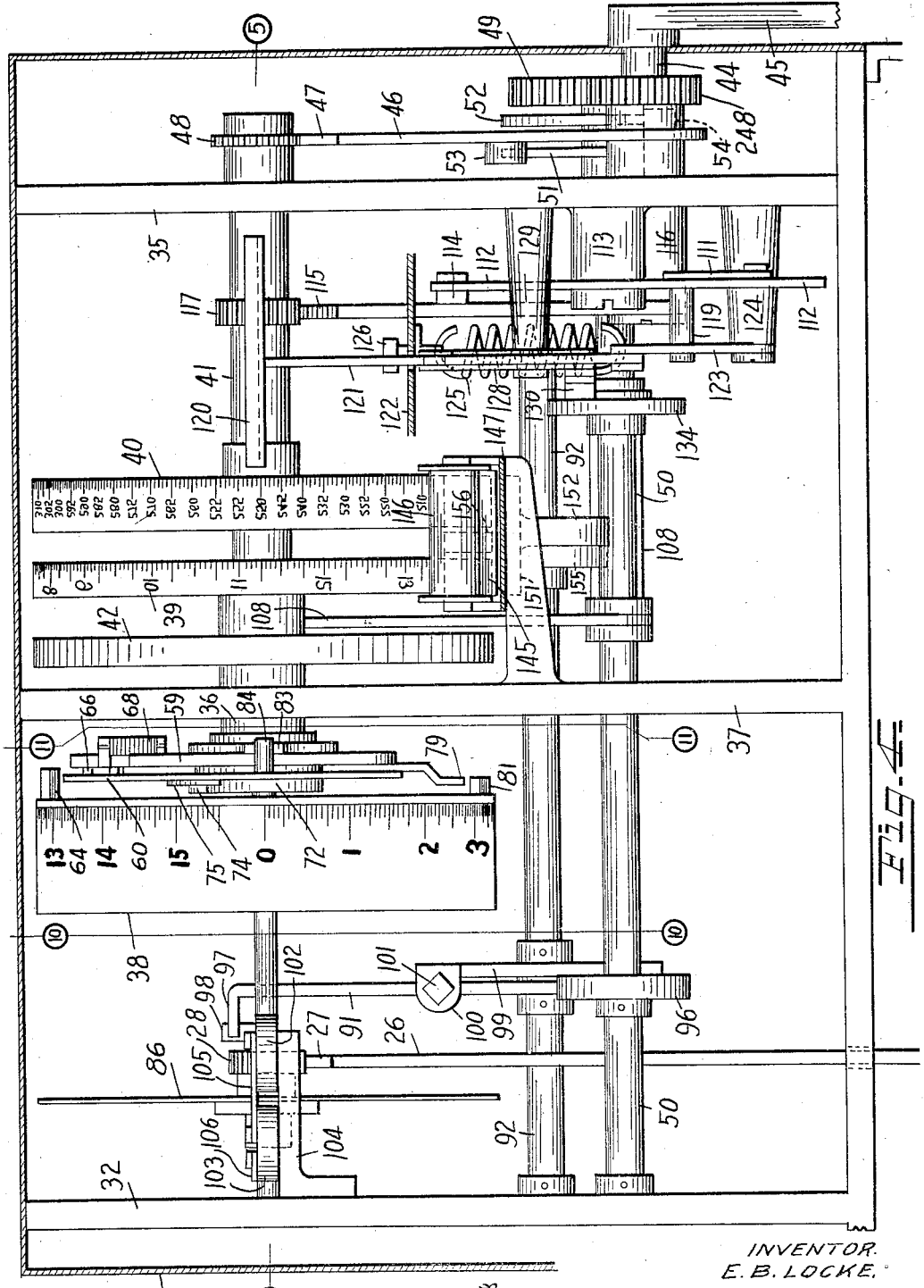

Nov. 10, 1931. E. B. LOCKE 1,831,182
COMPUTING SCALE
Filed Jan. 15, 1923 7 Sheets-Sheet 5
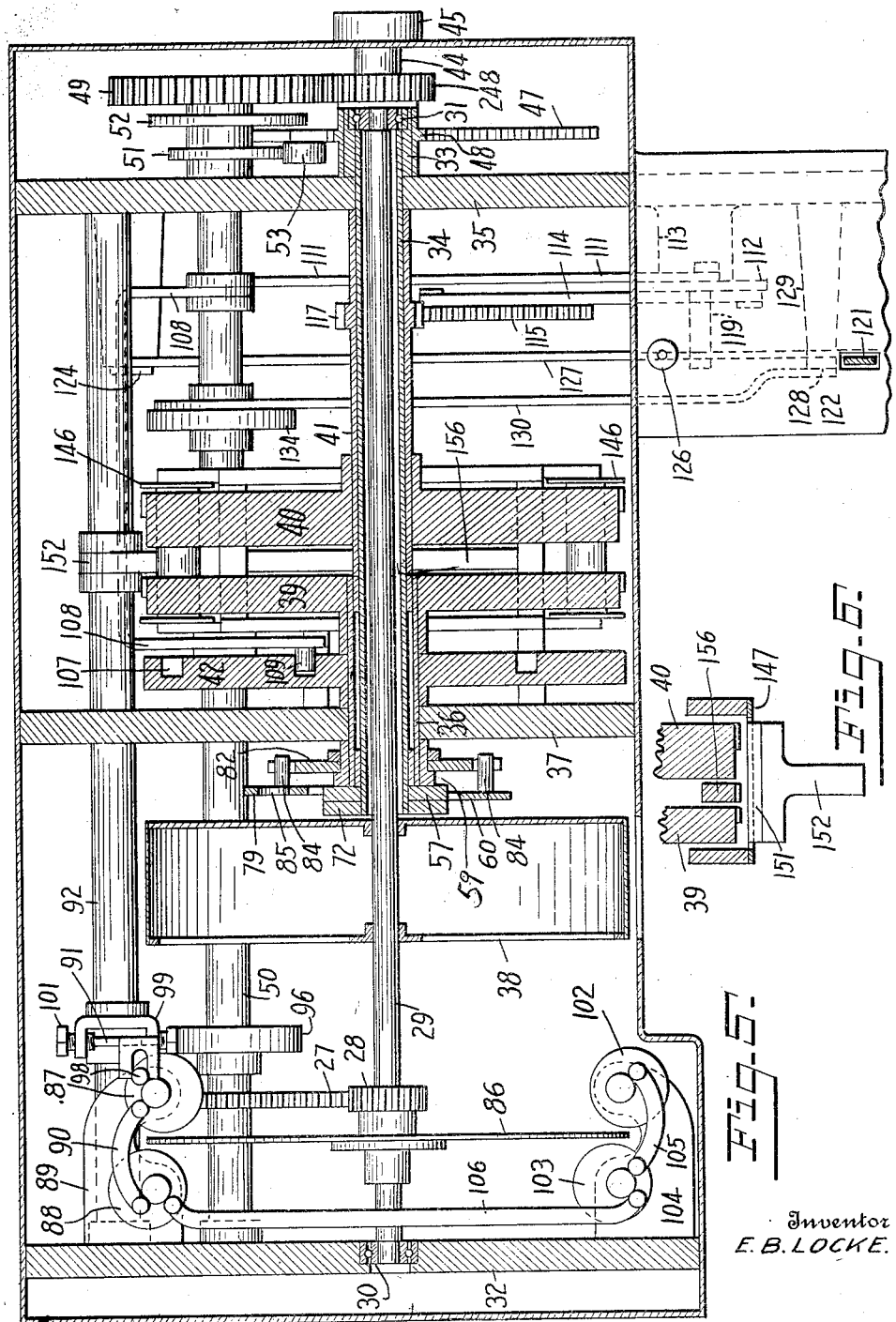
Inventor
E. B. LOCKE.

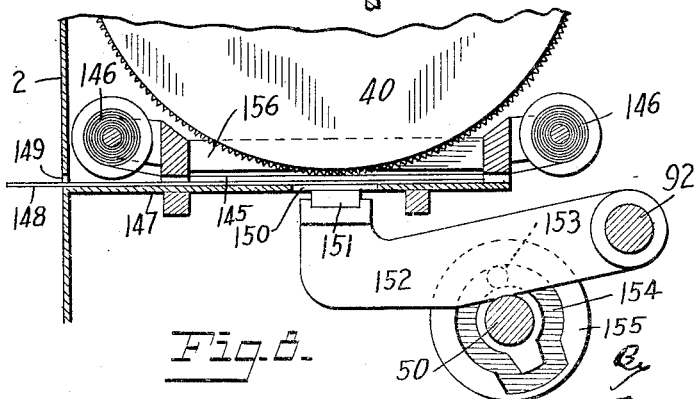

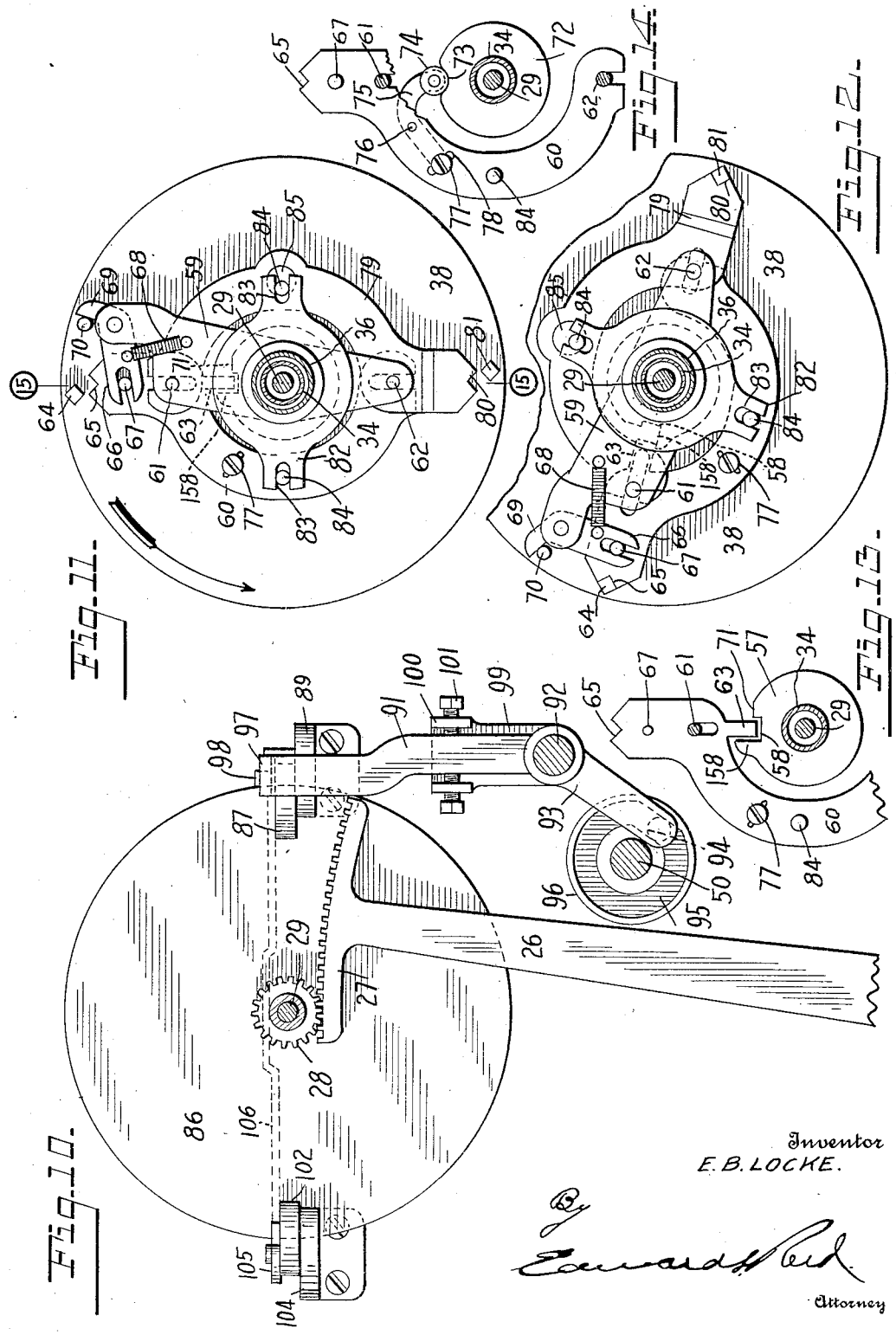

Patented Nov. 10, 1931

1,831,182

UNITED STATES PATENT OFFICE

EDWARD B. LOCKE, OF CINCINNATI, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK

COMPUTING SCALE

Application filed January 15, 1923. Serial No. 612,646.

This invention relates to computing scales and the like.

One object of the invention is to provide a weighing mechanism which will accurately effect a computation based upon the weight of the load and upon a selected unit of computation and will register the completed computation.

A further object of the invention is to provide such a mechanism which will simultaneously register the weight of the load and the result of a computation based on a unit of computation.

A further object of the invention is to provide such a mechanism with means for recording the result of the computation.

Further objects of the invention will appear as the mechanism is described in detail.

In the accompanying drawings Fig. 1 is a front elevation of a scale embodying my invention; Fig. 2 is a side elevation of such a mechanism with the base in section; Fig. 3 is a sectional view taken on the line 3—3 of Fig. 2 with the base partly broken away; Fig. 4 is a front elevation of the computing and printing mechanism; Fig. 5 is a horizontal sectional view taken on the line 5—5 of Fig. 4; Fig. 6 is a sectional detail view of the printing wheels and the platen; Fig. 7 is a detail view of the operating mechanism for the computation registering device; Fig. 8 is a sectional detail view showing the printing mechanism; Fig. 9 is a detail view of the driving mechanism; Fig. 10 is a section taken on the line 10—10 of Fig. 4; Fig. 11 is a sectional view taken on the line 11—11 of Fig. 4; Fig. 12 is a view similar to Fig. 11 showing the locking devices in their locking positions; Fig. 13 is a detail view of one of the locking plates and its cooperating disk; Fig. 14 is a detail view of one of the locking plates, partly broken away; Fig. 15 is a longitudinal section of the locking mechanism taken on the line 15—15 of Fig. 11; Fig. 16 is a detail view of the record printed by the machine; and Fig. 17 is a detail view of a slightly modified form of the device showing manually operated means for selecting the unit of computation.

In these drawings I have illustrated one embodiment of my invention but it will be understood that this particular embodiment has been chosen for the purpose of illustration only and the mechanism may take various forms without departing from the spirit of the invention.

In the particular embodiment here shown the mechanism is enclosed in a casing consisting of a lower horizontal portion 1 constituting a base and an upright portion 2 extending upwardly from one end of the base and in open communication therewith. Mounted on the base 1 and arranged within the same is a load balance which may be of any suitable character but which, as here shown, consists of a load platform 3 having a series of depending arms 4 which extend through an opening 5 in the top wall of the base 1 and are provided at their lower ends with bearings 6 which rest upon pivot pins 7 which form a support for the load platform. The pivot pins 7 which support the load platform 3 are part of the balancing mechanism which, as here shown, consists of two parallel bars 8 and 9 each having at each end thereof a cross head 10 and each cross head being provided with two pivot pins extending therefrom on the opposite sides of the axes of the respective bearings. The pivot pins 7 are arranged at the inner ends of the cross heads 10, and, as has been stated, form the support for the load platform. The pivot pins 11 at the opposite ends of the respective cross heads engage bearings 12 carried by the base. These bearings form the support for the balancing mechanism. Each of the transverse bars 8 and 9, which in effect constitute rock shafts, is provided with an inwardly extending arm, 13 and 14, respectively. These arms are pivotally connected one to the other as shown at 15. The arm 13 extends beyond the pivotal connection 15 to a point beneath the upper portion of the casing 2 where it is provided with a bearing 16 with which engages a pivot 17 carried by a yoke 18 which is connected by means of a flexible strap 19 with a segmental bracket 20 rigidly secured to a shaft 21, which extends lengthwise of the casing and is journaled at its ends in bearings 22 and 23. The shaft as here shown is preferably provided with a counterbalance 24 and may, if desired, be connected with a dash pot 25. The load balancing mechanism here shown and described is of an ordinary construction, the operation of which is well understood and need not be here described in detail.

Rigidly secured to the shaft 21 and extending upwardly therefrom is an arm 26 provided at its upper end with a segmental rack 27 which meshes with a pinion 28 rigidly secured to a shaft 29, which shaft extends lengthwise of the casing 2 and is journaled at its respective ends in bearings 30 and 31. The bearing 30 is mounted on a transverse frame member 32 forming part of the casing and the bearing 31 is mounted in a sleeve or hub 33 rigidly secured to and forming a part of a tubular shaft 34 which extends about the shaft 29 and is journaled at its outer end in a frame member 35 and at its inner end in a second tubular shaft 36 which in turn is journaled in a frame member 37. The shaft 29 is supported out of contact with the tubular shaft 34 and the bearings 30 and 31 are preferably ball bearings so as to reduce to a minimum the frictional resistance to the rotation of the shaft and to render the same very sensitive and accurately responsive to any variations in the load on the load balance. Rigidly secured to the shaft 29 and rotating therewith is a part 38 which is here shown as an indicating drum having its peripheral surface graduated in pounds and ounces. This indicator drum or rotatable part 38 is of such a character that it imposes but a very small load upon the shaft and does not appreciably affect the operation of the load balance. This rotatable part 38 constitutes the medium through which the load balance controls the operation of the actuating mechanism and so far as its controlling function is concerned it is immaterial whether or not it is in the form of an indicator but I prefer to utilize it as an indicator, as in this manner I provide a visual indication of the weight on the load platform.

The present machine is provided with means for registering both the weight and the result of the computation and preferably these registering devices are of such a character that a record can be taken therefrom. I have therefore shown two registering devices one of which comprises a type wheel 39, graduated in pounds and ounces to print the weight, and the other of which comprises a type wheel 40 which may be graduated to print the result of that particular computation for which the machine is designed. In the present instance, the machine is designed primarily for counting the articles or units in a mass of like articles or units placed upon the load platform and the printing wheel 40 is therefore divided into a large number of fine graduations, which are numbered. The printing wheels 39 and 40 are separately mounted and are separately operated. The printing wheel 39 is moved into and locked in a position corresponding to the position of the indicating drum 38. The movement of the computation printing wheel 40 is controlled both by the load balance, through the rotatable member or indicator drum 38, and by a separate controlling device which controls the movement imparted thereto according to a predetermined unit of computation, such as the weight of one of the articles to be counted. The arrangement of the printing wheels and the character of the mechanism by which they are operated may take various forms, but as here shown, the weight printing wheel 39 is rigidly secured to the outer tubular shaft 36, while the computation printing wheel 40 is rigidly secured to a third tubular shaft 41 which is rotatably mounted on the inner tubular shaft 34 but has free rotation relative thereto. Rigidly secured to the tubular shaft or sleeve 36 for rotation in unison with the weight printing wheel 39 is an actuating device 42 which serves, through the medium of certain interposed mechanism, to impart movement to the computation registering device or printing wheel 40. As has been stated movement is imparted to the weight printing wheel 39 and the actuating device 42 independently of the shaft 29 and the load balance by means of which that shaft is operated. This operating means may be of any suitable character but, in the present machine, it consists of a short shaft 44 journaled in the wall frame member 35 and having one end extending beyond the end of the casing 2 where it is provided with an operating device or handle 45. Loosely mounted on the shaft 44 is a rock arm or lever 46 having at its upper end a segmental toothed rack 47 which meshes with a pinion 48 rigidly secured to the hub or sleeve portion 33 of the tubular shaft 34. Rigidly secured to the shaft 44 is a pinion 48 which meshes with a gear 49 rigidly secured to a shaft 50 arranged parallel with the shaft 44 and extending substantially the full length of the casing 2. Mounted on the shaft 50 is a suitable cam device for actuating the rock arm 46. In the present instance the cam device consists of two cams 51 and 52 arranged to act respectively upon projections or rollers 53 and 54 carried by laterally extending arms 55 and 56, rigidly secured to and forming part of the lever 46. The arrangement of this cam device is such that the continuous rotation of the shaft 50 in one direction will impart rocking movement to the arm 46 and consequently to the tubular shaft 34, and the character of the gearing is such that the shaft 34 will be turned through a complete rotation in one direction and then returned to its initial position. The rotatory movement of the tubular shaft 34 is imparted to the actuating device 42 and weight printing wheel 39 through suitable connections or locking mechanism which is controlled by the rotatable member 38 in such a manner that the amount of movement imparted to the actuating device and weight printing wheel corresponds accurately to the amount of movement which has been imparted to the rotatable part 38 by the load balance. The connection between the tubular shaft and the parts to be operated and the means for controlling these movements may take various forms. As has been stated the inner tubular shaft 34 is journaled within the outer tubular shaft 36 which carries the actuating device and the weight printing wheel and in order to connect the shafts one to the other and thus impart movement to the actuating device and the weight printing wheel, I have rigidly secured to the inner shaft 34 a disk 57 having in its periphery a notch 58. Rigidly secured to the outer shaft 36 and adjacent to the disk 57 is a lever 59 having parts extending on the opposite sides of said shaft. Extending about the disk 57 is a curved plate 60 which is connected with the lever 59 by pin and slot connections arranged on opposite sides of the shaft, as shown at 61 and 62, which connections serve to cause the plate 60 and the lever 59 to rotate together but will permit the plate to have radial movement relative to the lever and relative to the disk 57. The plate 60 has an inwardly extending finger 63 which rests normally in the recess 58 of the disk 57 so that the rotation of the disk with the inner shaft will impart rotation to the plate 60, the lever 59, the outer shaft 36 and the parts carried thereby. The plate 60 forms one part of a locking device the other part of which is carried by or rigidly connected with the rotatable part or indicator drum 38 and means are provided, and controlled by the position of the rotatable part 38, to impart radial movement to the plate 60 to cause the locking members to be brought into cooperative relation. As here shown the rotatable part or indicator drum 38 has a stud 64, which is preferably angular in cross section, rigidly secured to the end thereof, and the end of the plate 60 is provided with a notch or recess 65 adapted to embrace the stud 64 when radial movement has been imparted to the plate. The movement of the plate to cause it to operatively engage the stud will move the finger 63 out of the notch 58 in the disk 57 and thereby permit the disk and the inner shaft to continue their rotation independently of the outer shaft and the parts carried thereby, which are now rigidly secured to the rotatable part or indicator drum 38. Radial movement may be imparted to the plate 60 in various ways but, as here shown, a rock arm, 66 is pivotally mounted on the upper end of the lever 59 and has a pin and slot connection with the plate 60 as shown at 67. A spring 68 holds the arm 66 and consequently the plate 60 in their normal positions with the finger 63 in the recess 58. Rigidly connected with the rock arm 66 is a finger 69 arranged to engage a pin or stud 70 carried by or rigidly connected with the rotatable part or indicator drum 38. This pin is so arranged with relation to the stud 64 that as the plate 60 and lever 59 rotate the finger 69 will engage the pin 70 and impart radial movement to the plate 60 and cause the plate to operatively engage the stud 64. It will be understood that the rotatable part or indicator drum 38 will have been advanced from its normal or zero position to a position corresponding to the load which has been placed upon the load platform. Consequently the actuating device 42 and weight printing wheel 39 will be rotated until the plate 60 is actuated to lock the outer shaft to the rotatable part 38. The type on the weight printing wheel 39 is so arranged with relation to the indications on the indicator drum 38 that when the two parts are locked one to the other the type which are in printing position and the indications which are in indicating position will correspond. To facilitate the clearance of the notch 58 by the finger 63 the disk 57 is cut away at the rear side of the notch as shown at 71, thus shortening the rear wall of the notch but providing at this point a cam surface which will engage the end of the finger and force the plate upwardly into engagement with the stud 64, if the rock arm 66 has not completed this movement.

Means are also provided for adjusting the movement of the locking plate 60 and for retaining this plate in its locking position until the inner shaft 34 is restored to its normal position with relation to the plate. To this end I have mounted on the inner shaft alongside the disk 57, a second disk 72 having in its upper edge a curved recess 73 adapted to receive a roller 74 carried by an arm 75 rigidly but adjustably mounted on the plate 60. As here shown, the arm is pivotally mounted at 76 and extends beyond its pivot and has its end portion adjustably secured to the plate 60 by means of a screw 77 extending through a slot 78 in the plate 60 and engaging the end of the arm. It will be noted that the shape of the arm is such that its movement about the pivot 76 will move the roller 74 substantially radially of the disk 72. The first movement of the disk 72 with relation to the plate 60, after the latter has been actuated to disconnect the finger 63 from the plate 57, will cause the roller to move out of the notch 73, if it has not already been moved clear of the same, and to engage the periphery of the disk. The arm 75 is so adjusted with relation to the disk and the locking plate that when the roller is in engagement with the periphery of the disk the plate will be held firmly in contact with the stud 64. Because of the adjustability of the arm any wear or looseness in the operation of the mechanism may be readily taken up. So long as the roller remains on the periphery of the disk the plate will be held in its locking position, thereby maintaining the connection between the outer tubular shaft 36 and the rotatable part 38 until the various operations, which will be hereinafter described, have been completed and the shaft 34 is rotated in a reverse direction to restore the parts to a normal position.

If desired, the locking mechanism may be of such a character as to engage the rotatable part or drum on opposite sides of its center thus giving a firmer connection and one less likely to distort or strain the drum or its shaft. To this end I have, in the present instance, shown a second locking plate 79 similar to the plate 60 but arranged on the opposite side of the disk and having its notched end 80 diametrically opposite to the notched end 65 of the first plate. A second stud 81 is connected with the rotatable member or indicator drum and the two plates 60 and 79 are so connected one with the other that they will move simultaneously in opposite directions thus causing both to engage the respective studs at the same time. The connection is here shown as a plate 82 which is loosely mounted on the hub of the lever 59 and has its ends slotted as shown at 83 to receive pins 84 secured respectively to the plates 60 and 79. It will be noted that the plate 79 has no finger corresponding to the finger 63 but that movement is imparted thereto through the plate 82 by the movement of the plate 60. The plate 79 is guided by slots which receive the pins 61 and 62 which serve to connect the plate 60 with the lever 59. Preferably one of the pins 84 is adjustable so that all lost motion can be eliminated and, as here shown, the pin 84 which is carried by the plate 79 is mounted on an eccentric stud 85 which is rotatably mounted in the plate 79 and by the adjustment of this stud the position of the pin with relation to the actuating plate 82 may be adjusted.

Inasmuch as the rotatable member or indicator drum 38 serves to control the movement of the actuating device 42 and the weight printing wheel 39, and it is important that this rotatable member should not be moved from the position to which it has been moved by the load balance, it is desirable that some means be provided for locking the same against movement when the trip finger 69 engages the stud 64 on the rotatable member. I have, therefore, provided a locking device which is actuated by the movement of the operating handle or crank prior to the operation of the tubular shaft 34 and the parts connected therewith. As here shown, this locking mechanism comprises a disk 86 rigidly connected with the rotatable part 38 and, in the present instance, rigidly secured to the shaft 29 at one side of the rotatable part or drum 38. Cooperating with the disk 86 are two locking disks 87 and 88 which are arranged on opposite sides of the disk 86 and are eccentrically mounted so that their peripheries may be moved into and out of contact with the respective faces of the disk 86. Preferably the disks 87 and 88 are carried by a bracket 89 mounted on the frame member 32 and are connected one to the other by a link 90 to cause them to move in unison. Movement is imparted to the disks 87 and 88 from the cam shaft 50 which is operated by the handle 45 and serves to impart movement to the tubular shaft 34. As here shown a rock arm 91 is mounted on a shaft 92 and connected with a rock arm 93 having a pin 94 which extends into a cam groove 95 in a cam disk 96 rigidly secured to the cam shaft 50. At its upper end the rock arm 91 has a laterally extending portion 97 which is slotted to receive a pin 98 secured to the face of the disk 87 so that the rocking movement of the arm 91 will rotate the disk 87 into engagement with the disk 86, and will through the medium of the link 90 likewise rotate the disk 88 into engagement with the opposite face of the disk 86, thereby firmly clamping the disk 86 between the two locking disks and holding the disk 86 and the parts connected therewith firmly against movement. To enable the movement of the locking disks 87 and 88 to be regulated I have established an adjustable connection between the rock arm 91 and the arm 93. As here shown the arm 91 is loosely mounted on the shaft 92 and the arm 93 has rigidly connected therewith an arm 99 which is provided with laterally extending lugs 100 which embrace the arm 91. Mounted in the lugs 100 are screws 101 which establish the connection between the arm 91 and arm 99 and by adjusting these screws the relation of the arm 91 to the cam may be varied and the operation of the locking disks properly timed. It will be noted that the cam 96 is timed to operate the locking disks upon the first movement of the operating shaft 44 and prior to the movement of the inner tubular shaft 34 and to then hold the locking disks in their operative positions until the cam shaft has completed its rotation. It is desirable that the rotatable part or indicator drum and its shaft 29 be locked on both sides of the shaft to prevent any tendency to impose any undue strain upon the shaft which might cause it to spring or to be otherwise injuriously affected. I have therefore provided a second set of locking disks arranged to engage that portion of the main disk 86 opposite the first mentioned disks. The second pair of locking disks are similar to those above described and consist of two eccentric disks 102 and 103 mounted on a bracket 104 and connected one to the other by a link 105. The disk 103 is connected with the disk 88 of the first pair of locking disks by a link 106 which is so arranged as to cause the disks of both pairs to simultaneously engage the main disk 86. In this manner the drum is locked in its indicating position and held rigidly in that position during the operation of the printing mechanism.

It will be apparent from the foregoing description that when the load is placed on the load platform the operation of the load balance will advance the rotatable part or indicating drum 38 a distance corresponding to the weight of the load and that the subsequent operation of the operating shaft by its handle will first lock the rotatable part in its adjusted position and will then advance the actuating device or cam 42 and the weight printing wheel 39 to a position corresponding to the position of the rotatable part 38 in which position they will be locked and disconnected from the operating shaft so that the latter may continue its movement for the purpose of printing the record, as will hereinafter appear. The computation registering device or printing wheel 40 being disconnected from the shaft 34 is not directly operated thereby but movement is imparted to this registering device from the cam 42. The amount of movement imparted to the registering device depends primarily upon the amount of movement imparted to the actuating device or cam 42 which, as has been stated, is determined by the load on the load balance. The movement of the actuating device 42 being controlled wholly by the weight of the load it is necessary, in order that a computation may be effected, that some means be provided whereby the amount of movement imparted to the registering device 40 by a given amount of movement of the actuating device 42 may be varied according to a selected unit of computation. In other words, when the device is used as a counting scale, a load weighting five pounds will always move the actuating device 42 and the weight printing wheel 39 exactly the same distance, but if this five pound load is made up of a number of articles each weighing one-half ounce it will be obvious that the registering device 40, in order to indicate the number of articles in the load, must be moved a distance much farther than would be necessary to indicate the number of articles in that five pound load if each of said articles weighed one ounce. Likewise if the device is used for computing price the registering device must be moved different distances by loads of the same weight when the price per pound varies, I have therefore interposed between the actuating device 42 and the registering device 40, suitable connecting mechanism the operation of which may be controlled according to a selected unit of computation. In the present instance this connecting mechanism comprises a lever which is operatively connected with the registering device and with the cam or actuating device 42, the latter connection being of such a character that the point of connection between the lever and the cam may be shifted radially of the lever thereby enabling the movement imparted to the lever by a given amount of movement of the actuating device to be varied. The connecting mechanism between the actuating device and the register may take various forms and may be controlled in various ways but I have, in the present instance, shown the actuating device as comprising a cam disk having in one face thereof a spiral groove 107. Pivotally mounted upon the cam shaft 50 is a rock arm or lever 108 in one end of which is mounted a pin 109 adapted to enter the cam groove 107 so that the rock arm will be actuated by the cam. In the present instance the rock arm 108 is mounted on the shaft 50 near the right hand end of the machine, (see Fig. 5), and in order to bring the same into operative relation with the cam it is given substantially a U-shape so that it will extend about the registering devices 39 and 40 and will have its end portion arranged substantially parallel with the face of the cam disk 42. Rigidly connected with the rock arm 108 and extending below the shaft 50 is a crank arm 110 which, in the present instance, forms an integral extension to the arm 108. The crank arm 110 is connected by means of a link 111 with a lever 112 pivotally mounted between its ends on a stud shaft 113. The link 111 is connected with the lower end portion of the lever 112 and the upper portion thereof is connected by a link 114 with a toothed segment 115 which is pivotally mounted at 116 and which meshes with a pinion 117 secured to the shaft 41 on which the registering device 40 is mounted. It is apparent therefore that the rotary movement imparted to the actuating device 42 will, through the lever 112 and segment 115, impart rotary movement to the registering device 40. In order to control this movement according to a unit of computation I have provided means for shifting the connection between the link 111 and the lever 112 toward and from the axis of the lever, thereby varying the amount of movement imparted to the lever by a given movement of the actuating cam 42. As here shown the lower portion of the lever 112 is provided with an elongated slot 118 in which is slidably mounted a pin 119 carried by the link 111 and constituting a connecting element between the link and the lever. The slot 118 is curved about the axis of the link 111 so that the movement of the pin 119 toward and from the axis of the lever will not affect the position of the lever. The position of the pin 109 in the slot 118 is determined by the unit of computation and, in the present instance, in which the machine is designed primarily as a counting scale, I have provided a unit balance adapted to receive a unit consisting of one or more of the articles to be counted. This balance, as here shown, consists of a unit pan 120 mounted on a stem 121 which is slidably mounted in a forwardly extending portion 122 of the casing 2. This stem 121 of the load balance is pivotally connected at its lower end with a rock arm or lever 123 which is pivotally mounted near the rear wall of the casing 2, as shown at 124. A spring 125 is connected with the rock arm 123 and with the top wall of the casing 122 and serves to retain the load normally in its elevated position and to resist the downward movement thereof. The spring 125 is of such a character that the addition of a given amount of weight to the unit balance, in any position which it may occupy, will move the rock arm 123 exactly the same distance. If desired the connection between the spring and the casing may be adjustable as shown at 126. The arm 123 is operatively connected with the link 111 so that the movement of the unit balance will shift the point of connection between the link 111 and the lever 112. As here shown, the arm 123 is provided with a curved slot 127 into which extends the pin 119 which connects the link 111 with the lever 112. It will be obvious therefore that the greater the weight of the load placed on the unit balance the greater the distance which the point of connection between the link 111 and the lever 112 will be moved away from the axis of the lever. The further the pin 119 is spaced from the axis of the lever 112 the smaller the movement imparted to the segment 115 by the lever. Consequently when the unit of computation or article to be counted is of light weight and the pin 119 is near the upper end of the slot 118 a given movement of the actuating cam 42 will cause the lever 112 and the registering device 40 to be moved a relatively great distance, thereby indicating a relatively large number of parts in the load on the load balance. If the weight of the unit on the unit balance is such as to move the pin 119 to a point near the lower end of the slot 118 the same amount of movement imparted to the actuating cam 42 will cause a much smaller amount of movement to be imparted to the segment 115 and consequently, the registering device 40 will register a much smaller number of articles in the load balance. If desired, means may be provided for positively retaining the unit balance in its adjusted position during the manipulation of the mechanism and in the present drawings I have shown a friction latch 128 pivotally mounted in the casing 122 at 129 and having one end arranged to frictionally engage the stem 121 of the unit pan 120 and to thus hold this stem against vertical movement. The latch 128 is connected at a point below its axis 129 with a link 130 the rear end of which is slotted, at 131, to extend about the cam shaft 50 and is provided with a pin 132 extending into a cam slot 133 in a cam 134, which is so shaped that the initial movement of the cam shaft will actuate the link 130 to cause the latch to grip the stem of the load balance and which will then retain the latch in a gripping position until the cam shaft has substantially completed its rotation and the several operations have been completed.

While the machine here shown is designed primarily as a counting scale it will be understood that the operation of the registering device by the actuating device 42 may be controlled according to price or to some other unit of computation and under such circumstances the controlling device may be set by hand instead of being actuated by the weight of a unit to be counted. This manual adjustment may be secured in any suitable manner but, in Fig. 17, I have shown the manual operating device as applied to the unit balance so that the operation may be controlled either by the weight of the unit or by the manually operated device. As here shown I have slidably mounted in the casing 122 a bar 135 having its forward edge inclined and preferably provided with a series of shoulders or steps 136. This edge of the slidable bar 135 is adapted to engage and ride over a pin 137 carried by the stem 138 of the unit pan 139 which stem is connected with the rock arm 123. Each shoulder 136 represents a predetermined unit of computation and when the bar 36 is advanced to bring the different shoulders into contact with the pin 137 the stem 138 of the unit balance will be forced downwardly and the effect will be the same as if a unit of weight had been placed upon the unit pan. Obviously there may be any desired number of operative positions on the forward edge of the slotted bar and these positions may represent any desired unit of value. Operative movement may be imparted to the slide bar in various ways but, as here shown, a pointer 140 is secured to the bar and extends through a slot 141 in the wall of the casing and has its point arranged adjacent to a scale or series of graduations on the front of the casing. The pointer is provided with a knob or other suitable handle 142 by means of which it may be moved from position to position and the pointer will indicate on the scale the position to which the bar has been moved. A spring actuated detent 143 engages the notched lower edge 144 of the bar 135 to hold the same in adjusted positions.

A record may be taken from the registering devices 39 and 40, in any suitable manner but, in the present instance, these registering devices are provided with raised type and the record is taken by means of a platen. Various means may be provided for inking the type but I prefer to utilize an inked ribbon as shown at 145 in Fig. 8, the ribbon being mounted on spools 146 arranged on opposite sides of the printing point. Arranged beneath the printing wheels is a table or other suitable support 147 adapted to support a record card 148 which is inserted between the table and the printing wheels, through a slot 149 in the front wall of the casing 2. The table 147 is provided immediately beneath the printing point with an opening 150 to permit a platen 151 to be moved into contact with the printing wheels or rather to press the card 148 into contact with the ribbon and the printing wheels. As here shown the platen 151 is carried by an arm 152 which is pivotally mounted on the shaft 92 and extends forwardly therefrom. A pin 153 carried by the platen arm 152 extends into a cam groove 154 in a cam disk 155 secured to the cam shaft 50. The cam groove is of such a shape and so arranged that it will cause the operation of the platen after the computing and registering operations have been completed. The printing wheels, 39 and 40, are finely graduated and the printing type consists of large numbers of fine lines closely arranged one to the other. Consequently, the operation of the platen 151 will cause several of these graduations or lines to be printed on the record card and in order that it may be readily determined which particular lines represent respectively the weight and the result of the computation I have interposed between the two printing wheels a type bar 156 bearing on its lower surface a raised arrow, as shown at 157 in Fig. 16. This arrow is arranged exactly on the printing line and as it is immovable will always indicate on the record the exact position of the printing line with relation to the several graduations printed on that record and will therefore indicate on the two series of graduations the exact weight and the exact result of the computation.

It will be remembered that after the outer tubular shaft 36 carrying the registering devices, 39 and 40, had been locked to the rotatable device 38 this outer tubular shaft and its associated parts were disconnected from the inner shaft 34 so that the latter could continue its rotation independently thereof. This continued rotation of the inner tubular shaft causes, first, the operation of the printing mechanism, as has just been described, it being noted that the arrangement of the printing cam is such that the printing operation will take place near the end of the first half revolution of the cam shaft, this shaft making one complete revolution upon each operation of the machine. When the cam shaft has completed the first half of its revolution and the printing operation has been accomplished, the segment 47 reverses the direction of its movement and the inner tubular shaft 34 is rotated in the opposite direction. This reverse movement of the shaft 34 will cause the forward wall, 158, of the recess 58 in the disk 57 to engage the finger 63 on the locking plate 60. At the same time the recess 73 in the disk 72 will be brought into line with the roller 74 on the arm 75, thus releasing the locking plate for inward movement. The pressure of the projection 158 against the finger 63 will tend to force the locking plate inwardly and out of engagement with the inclined wall of the stud 64, this movement being permitted by the yielding of the trip finger 69. In this manner the shaft 34 and its associated parts are disconnected from the rotatable member 38 and are returned to their normal positions, as shown in Fig. 11. As the parts are restored to their normal positions the cam 96 completes its rotation and actuates the locking disks 87 and 88 to release the shaft 29 and the rotatable member 38, so that these parts will return to their normal positions as soon as the load is removed from the load platform.

While I have shown and described one embodiment of my invention I wish it to be understood that I do not desire to be limited to the details thereof as various modifications may occur to one skilled in the art.

Having now fully described my invention what I claim as new and desire to secure by Letters Patent, is:

1. In a mechanism of the character described, a load balance, a unit balance separate from said load balance, a registering device, and movable means controlled, as to its movement, by said load balance and said unit balance, and adapted to control in turn the amount of movement imparted to said registering device.

2. In a mechanism of the character described, a load balance, a unit balance separate from said load balance, a registering device, a movable device, means whereby said movable device is controlled, as to its movement, by said load balance, means whereby said movable device is adapted to impart movement to said registering device, and means actuated by said unit balance to control the amount of movement imparted to said registering device by said load controlled device.

3. In a mechanism of the character described, a load balance, a registering device, an actuating device to impart movement to said registering device, means whereby said actuating device is controlled, as to its movement, by said load balance, means to hold said load balance against operation during the entire operation of said actuating device, means independent of said load balance to control the movement imparted to said registering device by said load controlled device according to a predetermined unit of computation, and means for taking a record from said registering device.

4. In a mechanism of the character described, a load balance, a registering device, a cam to impart operative movement to said registering device, said cam and said registering device being rotatable about a common axis means controlled by said load balance to control said cam, and means independent of said load balance to control the movement imparted to said registering device by said cam according to a predetermined unit of computation.

5. In a mechanism of the character described, a load balance, a rotatable registering device, a device rotatable about the axis of said registering device and operable independently of said load balance to impart movement to said registering device, means controlled, as to its movement, solely by said load balance to control the last mentioned device, and means independent of said load balance to control the movement imparted to said registering device according to a predetermined unit of computation.

6. In a mechanism of the character described, a load balance, a registering device, a device to impart movement to said registering device, means controlled, as to its movement, by said load balance to control the last mentioned device, a unit balance independent of said load balance, and means associated with said unit balance to control the movement imparted to said registering device.

7. In a mechanism of the character described, a load balance, a registering device, a cam to impart movement to said registering device, means controlled by said load balance to control said cam, a unit balance independent of said load balance, and means associated with said unit balance to control the movement imparted to said registering device by said cam.

8. In a mechanism of the character described, a load balance, a registering device, a cam, an operative connection between said cam and said registering device, means controlled by said load balance to control said cam and means other than said load balance whereby the movement imparted to said registering device by a given movement of said cam may be varied.

9. In a mechanism of the character described, a load balance, a registering device, an actuating device, means for controlling the operative movement of said actuating device by said load balance, an operative connection between said actuating device and said registering device, a movable unit receptacle separate from said load balance, and means controlled by the movement of said unit receptacle to vary the amount of movement imparted to said registering device by a given movement of said actuating device.

10. In a mechanism of the character described, a load balance, a registering device, an actuating device, said actuating device and said registering device being movable about a common axis, means for controlling the operative movement of said actuating device solely by said load balance, means comprising a lever for operatively connecting said actuating device with said registering device, and means for varying the amount of movement imparted to said lever by a given movement of said actuating device.

11. In a mechanism of the character described, a load balance, a registering device, an actuating device, means for controlling the operative movement of said actuating device by said load balance, means comprising a lever for operatively connecting said actuating device with said registering device, a movable unit receptacle, and means controlled by the movement of said unit receptacle for varying the amount of movement imparted to said lever by a given movement of said actuating device.

12. In a mechanism of the character described, a load balance, a registering device, an actuating device, said actuating device and said registering device being movable about a common axis, means for controlling the operative movement of said actuating device by said load balance, a lever operatively connected with said registering device, means for connecting said lever with said actuating device, and means for shifting the point of connection between the last mentioned means and said lever toward and from the axis of said lever.

13. In a mechanism of the character described, a load balance, a registering device, an actuating device, means for controlling the operative movement of said actuating device by said load balance, a lever operatively connected with said registering device, means for connecting said lever with said actuating device, a movable unit receptacle, and means controlled by the movement of said unit receptacle for shifting the point of connection within the last mentioned means and said lever toward and from the axis of said lever.

14. In a mechanism of the character described, a load balance, a registering device, a cam controlled by said load balance, a lever operatively connected with said registering device, means for connecting said lever with said cam, and means for shifting the point of connection between the last mentioned means and said lever toward and from the axis of said lever.

15. In a mechanism of the character described, a load balance, a registering device, an actuating device, means for controlling the operative movement of said actuating device by said load balance, a lever operatively connected with said registering device, a crank arm operatively connected with said actuating device, a member connecting said crank arm with said lever, and means for shifting the point of connection between said connecting member and said lever.

16. In a mechanism of the character described, a load balance, a registering device, an actuating device, means for controlling the operative movement of said actuating device by said load balance, a lever operatively connected with said registering device, a rock arm operatively connected with said actuating device, a link connecting said rock arm with said lever, and means for shifting the point of connection between said link and said lever.

17. In a mechanism of the character described, a load balance, a registering device, an actuating device, means for controlling the operative movement of said actuating device by said load balance, a lever operatively connected with said registering device, a rock arm operatively connected with said actuating device, a link connecting said rock arm with said lever, a movable unit receptacle, and means actuated by the movement of said unit receptacle to shift the point of connection between said link and said lever.

18. In a mechanism of the character described, a load balance, a registering device, an actuating cam, means for controlling rotation of said actuating cam by said load balance, a rock arm having one end in operative relation to said cam, a lever operatively connected with said registering device and having a longitudinal slot therein, a link connected at one end with said rock arm and having at its other end a pin slidably mounted in the slot in said lever, and means for adjusting said pin in said slot.

19. In a mechanism of the character described, a load balance, a registering device, an actuating cam, means for controlling the rotation of said actuating cam by said load balance, a rock arm having one end in operative relation to said cam, a lever operatively connected with said registering device and having a longitudinal slot therein, a link connected at one end with said rock arm and having at its other end a pin slidably mounted in the slot in said lever, a movable unit receptacle, and means actuated by the movement of said unit receptacle for controlling the position of said pin in said slot.

20. In a mechanism of the character described, a load balance, a registering device, a cam disk, means for controlling the rotation of said cam disk by said load balance, said cam having a spiral groove in one face thereof, a rock arm having at one end a pin extending into said groove, a pinion connected with said registering device, a segment meshing with said pinion, a lever pivotally mounted between its ends and having one end operatively connected with said segment, a link connecting said rock arm with the other end of said lever and having a slidable connection therewith, a movable unit receptacle, and means controlled by the movement of said unit receptacle for adjusting the connection between said link and said lever.

21. In a mechanism of the character described, a load balance, a registering device, a cam disk, means for controlling the rotation of said cam disk by said load balance, said cam having a spiral groove in one face thereof, a rock arm having at one end a pin extending into said groove, a pinion connected with said registering device, a segment meshing with said pinion, a lever pivotally mounted between its ends and having one end operatively connected with said segment, and having its other end provided with a longitudinal slot, a link pivotally connected at one end with said rock arm, a pin carried by the other end of said link and extending through the slot in said lever, a movable unit receptacle, an arm connected with said unit receptacle and actuated thereby, and an operative connection between said arm and said pin.

22. In a mechanism of the character described, a load balance, a registering device, an actuating device, means for controlling said actuating device by said load balance, an operative connection between said actuating device and said registering device, a movable unit receptacle, means controlled by the movement of said unit receptacle for varying the amount of movement imparted to said registering device by a given movement of said actuating device, and means for securing said unit balance in its adjusted position.

23. In a mechanism of the character described, a load balance, a registering device, an actuating device, means for controlling the operative movement of said actuating device by said load balance, a lever, means to operatively connect said lever with said registering device, means to operatively connect said lever with said actuating device, and means for shifting the point of connection between said lever and one of said connecting means toward and from the axis of said lever.

24. In a mechanism of the character described, a load balance, a part operatively connected with and movable by said load balance, a registering device, an actuating device for said registering device, means controlled by said movable part to control the movement imparted to said actuating device, and means other than said movable part to control the amount of movement imparted to said registering device by said actuating device.

25. In a mechanism of the character described, a load balance, a part operatively connected with and movable by said load balance, a registering device, an actuating device for said registering device, means to secure said part in adjusted position and to lock said load balance during the entire operation of said actuating device, means controlled by said movable part to limit the movement imparted to said actuating device, and means other than said movable part to control the amount of movement imparted to said registering device by said actuating device.

26. In a mechanism of the character described, a load balance, a registering device, a device controlled by said load balance to impart movement to said registering device, means for operating said actuating device, means independent of said load balance to control the movement imparted to said registering device by said load controlled device according to a predetermined unit of computation, and means actuated by the operating means for said actuating device for taking a record from said registering device.

27. In a mechanism of the character described, a load balance, a part operatively connected with and movable by said load balance, a locking device for said movable part, a registering device, an actuating device for said registering device, means controlled by said movable part to control the movement imparted to said actuating device, an operating handle, means for connecting said operating handle with said locking device and said actuating device, said connecting means being of such a character that the operation of said handle will first cause the operation of said locking device and will then cause the operation of said actuating device, and means other than said movable part to control the amount of movement imparted to said registering device by said actuating device.

28. In a mechanism of the character described, a load balance, a part operatively connected with and movable by said load balance, a locking device for said movable part, a registering device, an actuating device for said registering device, means controlled by said movable part to control the movement imparted to said actuating device, an operating handle, means actuated by said handle for actuating said locking device, for moving said actuating device to a position corresponding to the position of said movable part, and for disconnecting said handle from said actuating device, and means other than said movable part to control the amount of movement imparted to said registering device by said actuating device.

29. In a device of the character described, a load balance, a part operatively connected with and rotatable by said load balance, a registering device, an actuating device for said registering device rotatable about an axis coincident with the axis of said rotatable part, means controlled by said rotatable part to control the movement imparted to said actuating device, and means other than said rotatable part to control the amount of movement imparted to said registering device by said actuating device.

30. In a mechanism of the character described, a load balance, a part operatively connected with and rotatable by said load balance, a registering device, a cam for actuating said registering device, means controlled by said rotatable part to limit the movement imparted to said cam, and means other than said rotatable part to control the amount of movement imparted to said registering device by said cam.

31. In a mechanism of the character described, a load balance, a rotatable part rotated by said load balance, a registering device, a device for actuating said registering device, means controlled by said rotatable part for securing said actuating device in a position corresponding to the position of said rotatable part, a movable unit receptacle, and means controlled by the movement of said unit receptacle to control the movement imparted to said registering device by said actuating device.

32. In a mechanism of the character described, a load balance, a rotatable part actuated by said load balance, a registering device, a device for actuating said registering device, normally inoperative devices for connecting said actuating device with said rotatable part, means controlled by said rotatable part for causing one of said connecting devices to operatively engage the other, and means other than said rotatable part to control the movement imparted to said registering device by said actuating device.

33. In a mechanism of the character described, a load balance, a rotatable part actuated by said load balance, means for securing said rotatable part in adjusted positions, a registering device, a device for actuating said registering device, cooperating locking devices respectively connected with said rotatable part and said actuating device, means controlled by said rotatable part for causing one of said locking devices to engage the other when said actuating device has been advanced to a position corresponding to the position of said rotatable part, and means other than said rotatable device to control the movement imparted to said registering device by said actuating device.

34. In a mechanism of the character described, a load balance, a rotatable part rotated by said load balance, means for securing said rotatable part in adjusted positions, a registering device, a device for actuating said registering device, a locking member connected with said rotatable part, a second locking member connected with said actuating device and movable into and out of operative engagement with the first mentioned locking member, a trip arm operatively connected with the last mentioned locking member, a stud connected with said rotatable part and arranged in the path of said trip arm, means for rotating said actuating device and the parts connected therewith, and means other than said rotatable part for controlling the movement imparted to said registering device by said actuating device.

35. In a mechanism of the character described, a load balance, a rotatable part actuated by said load balance, means for securing said rotatable device in adjusted positions, a registering device, an actuating device for said registering device, means for rotating said actuating device, cooperating members connected with said rotatable part and said actuating device to connect said actuating device with said rotatable part when it has been moved into a position corresponding to the position of said rotatable part, means to disconnect said actuating device from said rotatable part, and for rotating the same in a reverse direction when it has been disconnected from said rotatable part, and means other than said rotatable part for controlling the amount of movement imparted to said registering device by said actuating device.

36. In a mechanism of the character described, a load balance, a rotatable part actuated by said load balance, a registering device, an actuating device for imparting movement to said registering device, said rotatable part, said registering device, and said actuating device being mounted for rotation about a common axis, means for imparting rotation to said actuating device, means controlled by said rotatable part for controlling the movement imparted to said rotatable device, and means other than said rotatable part for controlling the movement imparted to said registering device by said actuating device.

37. In a mechanism of the character described, a load balance, a rotatable device actuated by said load balance, means for securing said rotatable part in adjusted positions, a registering device, an actuating device for said registering device, means for securing said actuating device to said rotatable part when it has been moved to a position corresponding to the position of said rotatable part, means other than said rotatable part to control the amount of movement imparted to said registering device by said actuating device, means for taking a record from said registering device, and an operating device for first operating said means to secure said rotatable part in its adjusted position, then moving said actuating device to a position corresponding to the position of said rotatable part and connecting the same therewith, and then causing a record to be taken from said registering device.

38. In a mechanism of the character described, a load balance, a rotatable part actuated by said load balance, a locking device to secure the rotatable part in adjusted positions, a registering device, an actuating device for said registering device, means for connecting said actuating device with said rotatable part when it has been moved to a position corresponding to the position of said rotatable part, means other than said rotatable part to control the movement imparted to said registering device by said actuating device, means for taking a record from said registering device, means for operating said locking device, said actuating device, and said record taking means, and means for disconnecting said operating means from said actuating means when the latter has been connected with said rotatable part.

39. In a mechanism of the character described, a load balance, a shaft, means controlled by said load balance for rotating said shaft, a part rotatable with said shaft, a registering device rotatable about the axis of said shaft, an actuating device for said registering device also rotatable about the axis of said shaft, means for rotating said actuating device relatively to said shaft, means controlled by said rotatable part to limit the movement of said actuating device, means operated by said actuating device for rotating said registering device relatively to said shaft and to said actuating device, and means independent of said shaft for controlling the amount of movement imparted to said registering device by said actuating device.

40. In a mechanism of the character described, a load balance, a rotatable shaft, means controlled by said load balance for rotating said shaft, a part rotatable with said shaft, a tubular shaft mounted about said shaft and rotatable relatively thereto, means for rotating said tubular shaft, a second tubular shaft mounted about the first mentioned tubular shaft and rotatable relatively thereto, a registering device mounted about and rotatable relatively to the first mentioned tubular shaft, an actuating device secured to said second tubular shaft and operatively connected with said registering device, means for connecting the first mentioned tubular shaft with the second tubular shaft, means controlled by said rotatable part for limiting the movement imparted to said second rotatable shaft, and means other than said rotatable part to control the amount of movement imparted to said registering device by said actuating device.

41. In a mechanism of the character described, a load balance, a rotatable shaft, means controlled by said load balance for rotating said shaft, a part rotatable with said shaft, a tubular shaft mounted about said shaft and rotatable relatively thereto, means for rotating said tubular shaft, a second tubular shaft mounted about the first mentioned tubular shaft and rotatable relatively thereto, a registering device mounted about and rotatable relatively to the first mentioned tubular shaft, an actuating device secured to said second tubular shaft and operatively connected with said registering device, means for connecting the first mentioned tubular shaft with the second tubular shaft, means controlled by said rotatable part for connecting said second tubular shaft with said rotatable part, means other than said rotatable part to control the movement imparted to said registering device by said actuating device, means to disconnect the first mentioned tubular shaft from said second tubular shaft when said second tubular shaft has been connected with said rotatable part, and means controlled by the further movement of said first mentioned tubular shaft to take a record from said registering device.

42. In a mechanism of the character described, a load balance, a registering device, a device controlled by said load balance to impart movement to said registering device, a unit receptacle mounted for movement by a unit thereon, means actuated by said unit receptacle to control the movement imparted to said registering device by said load controlled device, and manually operated means for actuating said unit receptacle to determine the movement of said registering device according to a predetermined unit of computation.

43. In a mechanism of the character described, a load balance, a registering device, an actuating device the operative movement of which is controlled by said load balance, said actuating device and said registering device being movable about a common axis, means comprising a lever for operatively connecting said actuating device with said registering device, and manually controlled means for varying the amount of movement imparted to said lever by a given movement of said actuating device.

44. In a mechanism of the character described, a load balance, a registering device, an actuating device the operative movement of which is controlled by said load balance, said actuating device and said registering device being movable about a common axis, a lever operatively connected with said registering device, means for connecting said lever with said actuating device, and manually operated means for shifting the point of connection between said last mentioned means and said lever toward and from the axis of said lever.

45. In a mechanism of the character described, a load balance, a registering device, an actuating device the operative movement of which is controlled by said load balance, a lever operatively connected with said registering device, a link for connecting said lever with said actuating device, and manually operated means for shifting said link with relation to said lever to vary the amount of movement imparted to said lever by said actuating device.

46. In a mechanism of the character described, a load balance, a registering device, an actuating device the operative movement of which is controlled by said load balance, a lever operatively connected with said registering device, a link for connecting said lever with said actuating device, a plunger connected with said link to shift the same with relation to said lever and thus vary the amount of movement imparted to said lever by said actuating device, a unit pan carried by said plunger, and means independent of said unit pan for actuating said plunger to control the movement of said lever according to a predetermined unit of computation.

47. In a mechanism of the character described, a load balance, a unit balance, a registering device, and means controlled by said balances for governing the amount of movement of said registering device in accordance with the amount of movement imparted to said load balance and said unit balance.

48. In a mechanism of the character described, a load balance, a unit balance, a registering device, means controlled by said balances for governing the amount of movement of said registering device in accordance with the degrees of movement imparted to said load balance and said unit balance, and means for taking a record of the computation registered by said registering device.

49. In a mechanism of the character described, a load balance, a unit balance, movable means controlled, as to its movement, by said load balance and said unit balance for computing the ratio between the loads carried by said balances, and means associated with said computing means for recording the computation thus effected.

50. In a mechanism of the character described, a load balance, a unit balance, movable means controlled, as to its movement, by said load balance and said unit balance for computing the ratio between the loads carried by said balances, means associated with said computing means for taking a record of the computation thus effected, and means for indicating the weight of the larger load.

51. In a mechanism of the character described, a load balance, a unit balance, movable means controlled, as to its movement, by said load balance and said unit balance for computing the ratio between the loads carried by said balances, means associated with said computing means for taking a record of the computation thus effected, means for indicating the weight of the larger load, and means for taking a record of said weight.

52. In a mechanism of the character described, a load balance, a unit balance separate from said load balance, a registering device, means controlled by said load balance and said unit balance to control the amount of movement imparted to said registering device, and means for taking a record from said registering device.

In testimony whereof, I affix my signature hereto.

EDWARD B. LOCKE.